United States Patent
Hershbarger et al.

(10) Patent No.: US 8,974,564 B2
(45) Date of Patent: Mar. 10, 2015

(54) SCREEN CLEANING SYSTEM

(75) Inventors: James M. Hershbarger, Leclaire, IA (US); Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 734 days.

(21) Appl. No.: 13/183,544

(22) Filed: Jul. 15, 2011

(65) Prior Publication Data

US 2013/0014341 A1  Jan. 17, 2013

(51) Int. Cl.
| | |
|---|---|
| *B01D 41/00* | (2006.01) |
| *F01P 11/12* | (2006.01) |
| *A01D 41/12* | (2006.01) |
| *B01D 46/00* | (2006.01) |
| *B01D 46/10* | (2006.01) |

(52) U.S. Cl.
CPC .............. *F01P 11/12* (2013.01); *A01D 41/1252* (2013.01); *B01D 46/0065* (2013.01); *B01D 46/10* (2013.01); *A01D 41/12* (2013.01); *Y10S 180/90* (2013.01)
USPC .................. 55/296; 15/33; 15/81; 15/250.29; 15/250.3; 15/250.32; 15/256.5; 15/256.53; 180/900; 55/282; 55/295

(58) Field of Classification Search
USPC ................ 55/282–305; 15/398–403, 33, 381, 15/53.1–53.4, 81, 250.29, 250.3, 250.32, 15/256.5, 256.52, 339; 180/900
See application file for complete search history.

(56) References Cited

U.S. PATENT DOCUMENTS

| | | | | |
|---|---|---|---|---|
| 3,339,348 | A * | 9/1967 | Bratton et al. | 55/294 |
| 3,377,780 | A | 4/1968 | Noland | |
| 4,443,236 | A | 4/1984 | Peiler | |
| 4,509,961 | A * | 4/1985 | Jones | 55/294 |
| 4,542,785 | A | 9/1985 | Bagnall et al. | |
| 5,114,444 | A * | 5/1992 | Stuble | 55/294 |
| 5,217,512 | A | 6/1993 | Williams | |
| 2008/0086991 | A1 * | 4/2008 | Hale | 55/378 |
| 2009/0211208 | A1 * | 8/2009 | Johnson et al. | 55/291 |

FOREIGN PATENT DOCUMENTS

| | | |
|---|---|---|
| DE | 19857681 A1 | 6/2000 |
| DE | 10103139 A1 | 7/2002 |
| EP | 1035308 A1 | 9/2000 |

OTHER PUBLICATIONS

Claas Lexion 580 Oct. 2007, 1 page.
European Search Report, dated Nov. 14, 2012 (5 pages).

* cited by examiner

*Primary Examiner* — Thomas McKenzie

(57) ABSTRACT

A screen cleaning system cleans debris from a material catching screen surrounded by a frame. A hollow vacuum arm which moves over the screen. The arm has a slot in a side which is adjacent to the screen. The arm includes an inner arm pivotally coupled to a duct and an outer arm which movable with respect to the inner arm. The arm is moved by an actuator mechanism which includes a first pulley coupled to a drive shaft, a second pulley coupled to an end of the arm, a belt drivingly coupling the first pulley to the second pulley. The outer arm is slidably coupled to the inner arm and a spring is biased to urge the outer arm radially inwardly. A track is formed by the frame and a roller rides along the track and is rotatably coupled to an end of the outer arm.

5 Claims, 5 Drawing Sheets

SCREEN CLEANING SYSTEM

FIELD OF THE INVENTION

The present disclosure relates to a screen cleaning system.

BACKGROUND OF THE INVENTION

Vehicles such as combines operate in dusty, dirty conditions that require engine cooling and intake air to be clean from debris found in the environment in which they typically operate. To deal with these conditions, most combines use a rotary screen, which consists of a rotating screen with a vacuum duct on the outside of the screen. The screen acts to keep debris from entering the engine along with the cooling and intake air while the duct has a suction flow that removes debris from the screen as it rotates under it. This system works very well for most applications but has the limitation of blocking airflow to the corners of the cooling cores that are not located directly in the middle of the screen. The cores located near the outsides of the screen then have decreased cooling capacity. Therefore a mechanism is necessary that removes debris from the engine cooling and intake air and allows complete exposure of cooling air to the cores.

SUMMARY

According to an aspect of the present disclosure, a vacuum duct pivots over the surface of a screen. An auxiliary brush is telescopically coupled to the rotating vacuum duct. As the duct rotates around the screen, the brush extends out to the corners of the screen and sweeps debris from the corners and brings it into the path of the vacuum duct where it is then removed from the screen by suction airflow imparted by the vacuum duct. The position of the brush is maintained by a roller which rolls in a track which surrounds the screen. The suction force of the engine fan holds the material in its place on the screen until the vacuum duct moves over the material and the material is removed by the suction imparted by the vacuum duct. The brush is designed so that it always pushes material inwardly from the outside of the screen so that material does not accumulate on the outer edges of the screen.

DETAILED DESCRIPTION OF THE DRAWINGS

Figure 1:
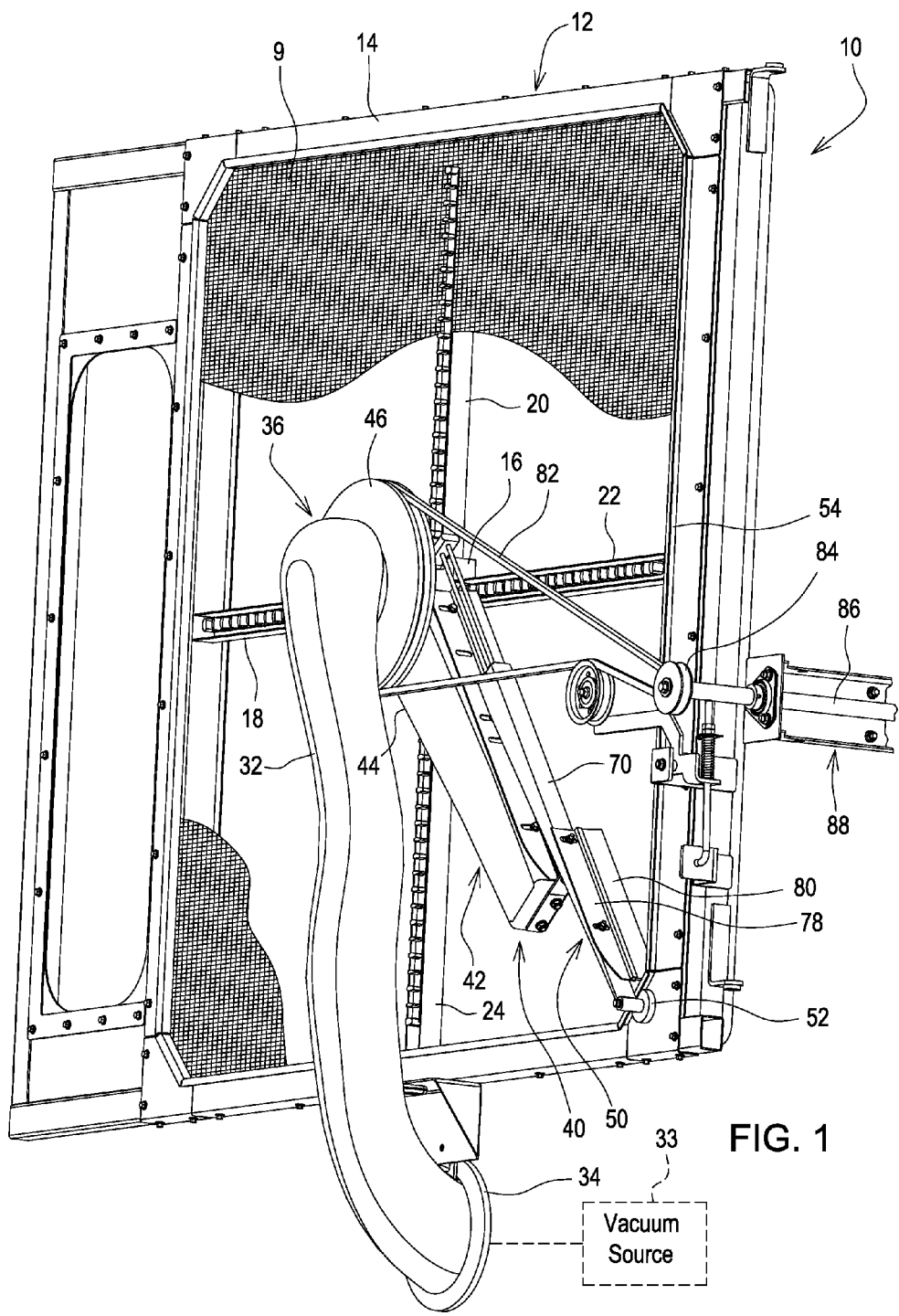
FIG. 1 is a perspective view of a screen cleaning system.
Figure 2:
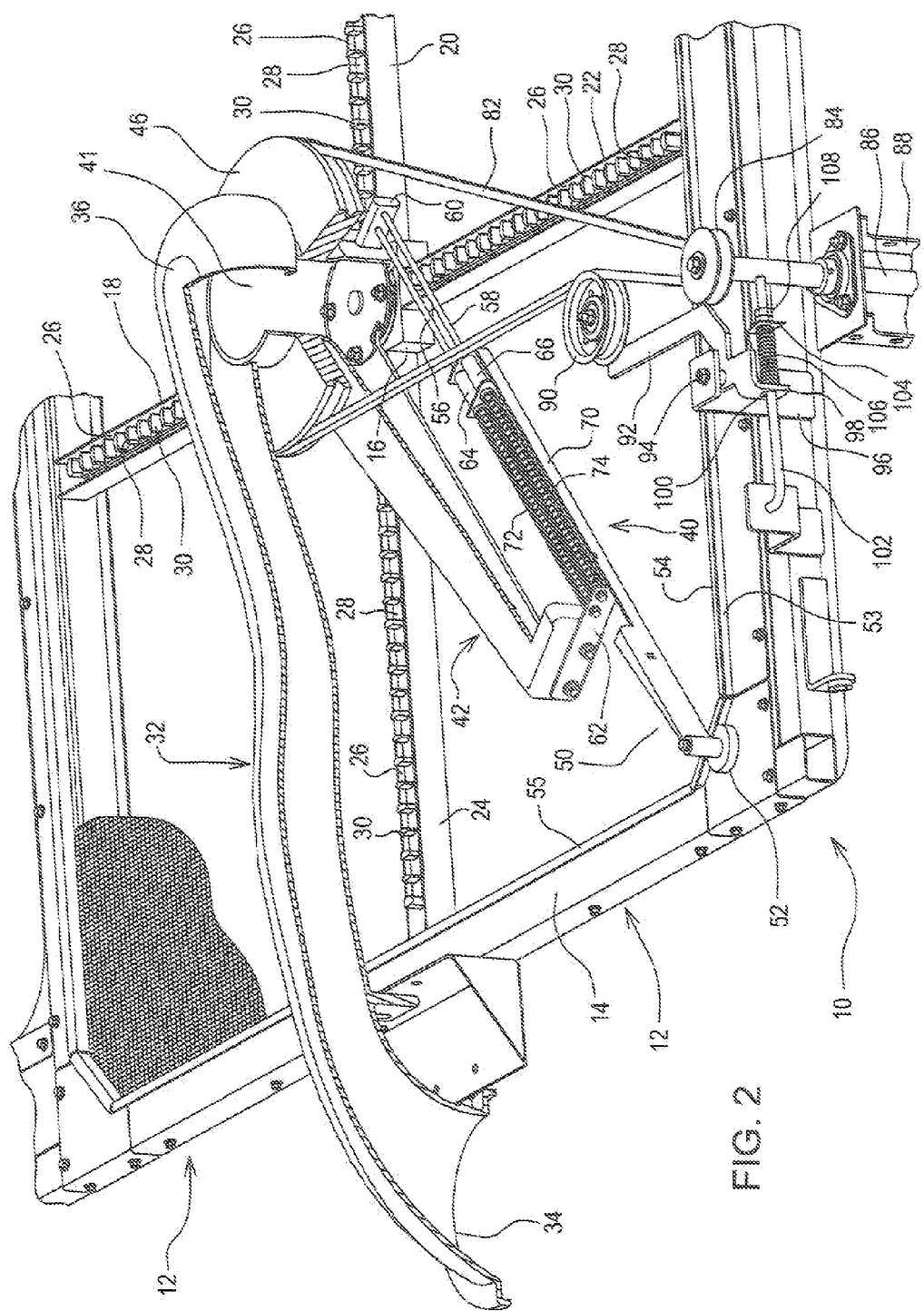
FIG. 2 is an enlarged perspective view of a portion of FIG. 1 with portions removed for clarity.
Figure 3:
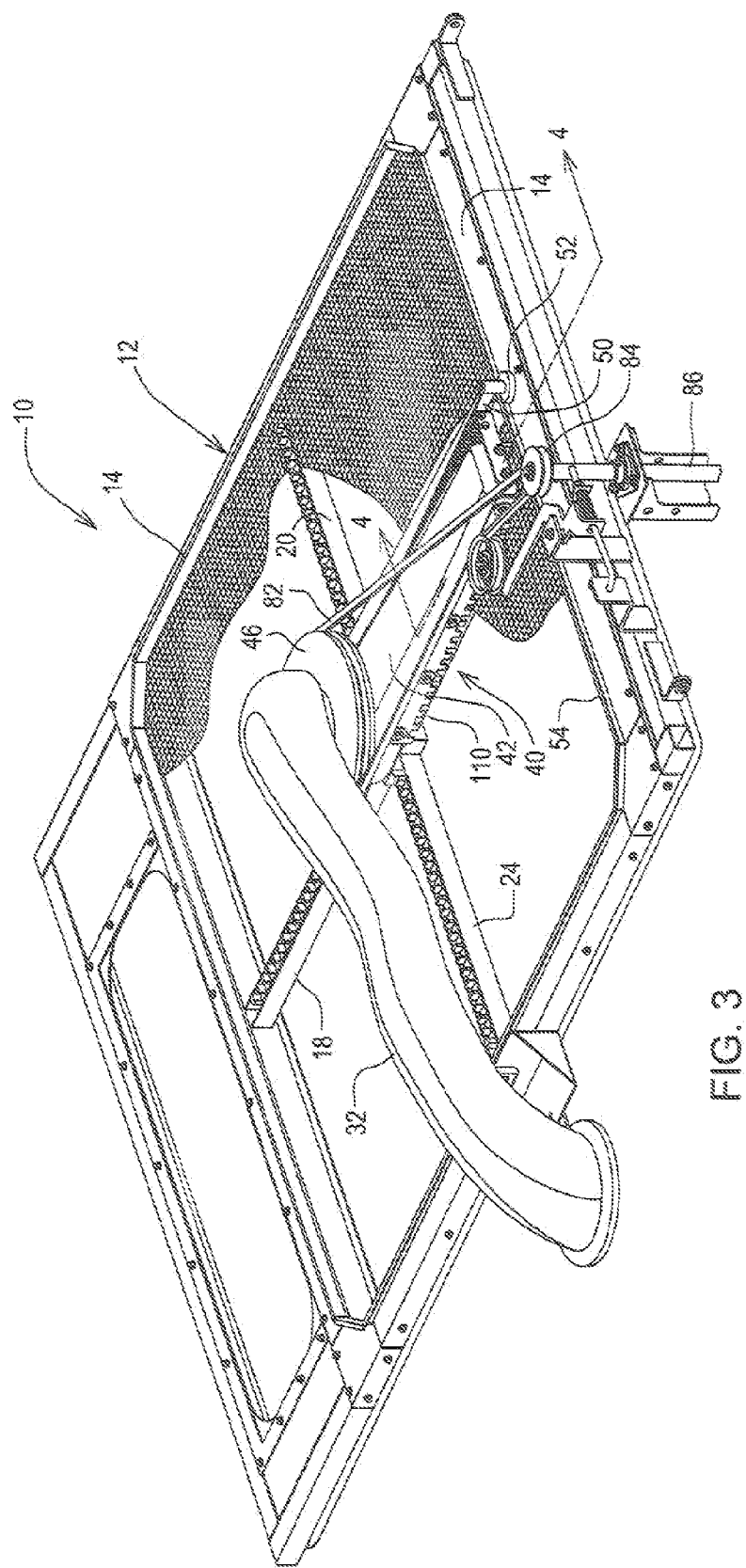
FIG. 3 is another perspective view of the screen cleaning system of FIG. 1.

Referring to FIGS. 1, 2 and 3, a screen assembly 10 is positioned so that engine intake and cooling air must flow though it so debris can be removed by a mesh screen 9. The screen assembly 10 includes a fame 12 which includes an outer fame 14 and a central hub 16. The frame 12 also includes frame arms 18, 20, 22 and 24 which extend between the housing 16 and the outer frame 14. The outer frame 14 surrounds and supports the mesh screen 9. As best seen in FIG. 2, each frame arm 18-22 has a recess or groove 26 in its side which faces the mesh screen 9. Each recess 26 receives an elongated member or rake bar 28 from which project a plurality of spaced-apart tabs 30. The mesh screen 9 is held by the outer frame 14 and extends over the frame arms 18-22 and is held in the grooves 26 by the rake bars 28.

Figure 5:
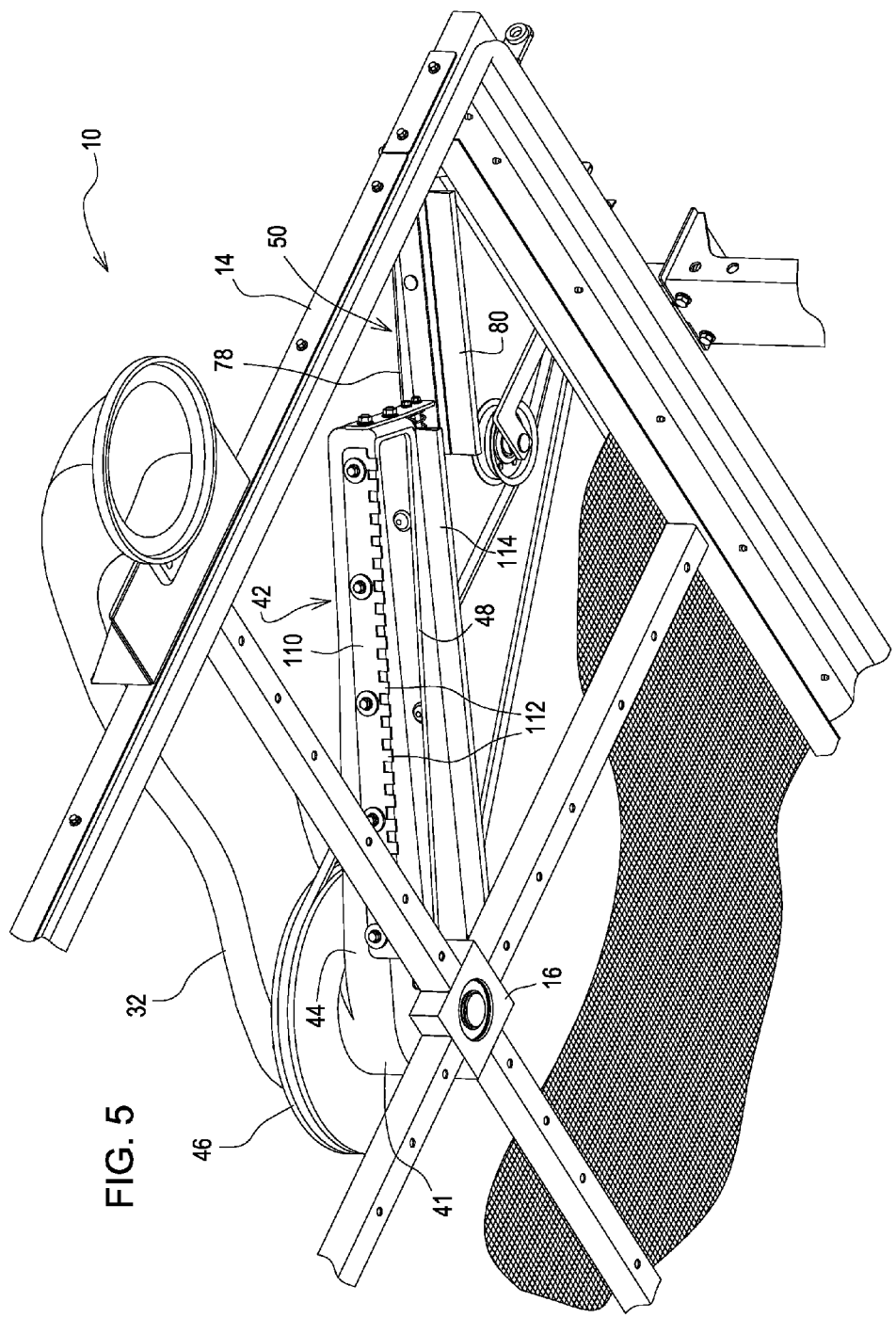
FIG. 5 is a perspective view of the screen cleaning system of FIG. 1 viewed from behind the screen.

A hollow duct 32 extends from a first end 34 positioned exterior to the outer frame 14 to a second end 36 near the hub 16. The first end 34 is connected to a vacuum source 33, such as an auxiliary vacuum fan (not shown) or a shroud aspirator (not shown) mounted to the engine radiator shroud (not shown). A sweeping arm assembly 40 is rotatably connected to the second end 36. Sweeping arm assembly 40 includes a hollow arm 42 which has a radially inner end 44 fixed to a central hollow hub 41. A circular pulley 46 is fixed to and surrounds the hub 41. As best seen in FIG. 5, the arm 42 has a slot 48 in the side facing the mesh screen 9 so that debris will be vacuumed off of the mesh screen 9, through the slot 46 and through the arm 42.

Figure 4:
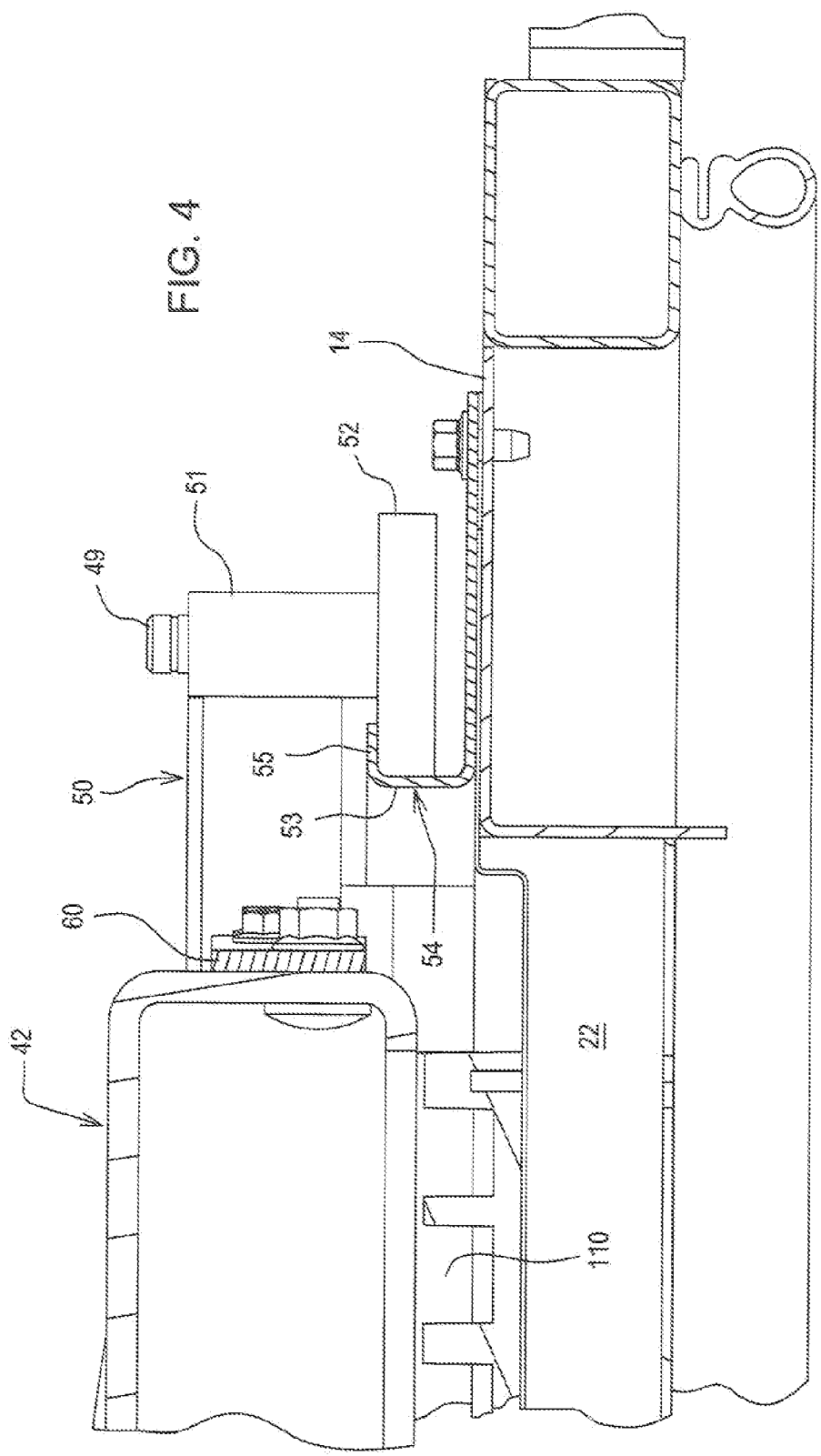
FIG. 4 is a view taken along lines 4-4 of FIG. 3.

Referring again to FIGS. 1 and 2, the sweeping assembly 40 also includes a brush member or outer arm 50 which is movably coupled to the hollow or inner arm 42 and is movable radially inwardly and outwardly with respect to the arm 24. The brush member 50 includes a roller 52 which rotatable supported at its outer end. The roller 52 is attached to a pin 49 which is rotatably received by a bearing sleeve 51 which is attached to the outer end of brush member 50. The roller 52 rides along a track 54 formed by the outer frame 14. Alternatively, the position of the brush member 50 could be maintained by a cam-and-roller (not shown) located near the pivot axis of the arm 42. As best seen in FIG. 4, track 54 includes a side wall 53 which extends around the inner edge of outer frame 14 and a lip 55 which projects outwardly from an edge of the side wall 53. Thus, the sweeping arm assembly 40 includes the inner arm 42 pivotally coupled to the duct 32 and the outer arm 50 which is movable with respect to the inner arm 42.

Guide rods 56 and 58 are supported by a first bracket 60 which is fixed to the hub 41 and by a second bracket 62 which is fixed to an outer end of arm 42. Sleeves 64 and 66 are slidably mounted on the rods 56, 58. Brush member 50 has a housing 70 which is attached to the sleeves 64 and 66. A pair of springs 72 and 74 are mounted on the rods 56 and 58 between the sleeves 64 and 66 and the bracket 62. The springs are biased to urge the brush member 50 radially inwardly and to hold roller 52 to the track 54. As best seen in FIG. 1, a bracket 78 is attached to a side of the brush member housing 70. The bracket 78 supports a brush 80 which sweepingly engages the mesh screen 9 as the sweeping assembly pivots around the axis of the hub 41.

As best seen in FIG. 2, the pulley 46 is rotated by a drive belt 82 which is driven by a drive pulley 84 which is attached to a drive shaft 86. Drive shaft 86 is rotatably supported by a bracket 88 which is attached to the outer frame 14. tension in the belt 82 is maintained by an idler pulley 90 which rotatably supported at and end of a lever member 92. Lever member 92 is pivotally supported on a pivot pin 94 which is supported by idler bracket 96 which is attached to the outer frame 14. An end portion of lever 92 forms a bracket 98 which has a bore 100 which slidably receives a tension adjust rod 102. A tension bracket 104 is fixed to the tension adjust rod 102. A spring 106 is mounted around the rod 102 between brackets 98 and bracket 104, and is biased to urge rod 102 to the right viewing FIG. 2. This tends to pivot lever 92 counter-clockwise, viewing FIG. 2 and thus lessens the tension idler pulley 90 places on the belt 82. A pair of tension adjust nuts 108 are threadably screwed onto a threaded portion of rod 102.

Referring now to FIG. 5, the slot 48 opens towards the mesh screen 9 so that it will vacuum debris off of the mesh screen 9. A comb member 110 is attached to a side of arm 42.

Comb member 110 includes a plurality of spaced apart tabs 112 which project towards the mesh screen 9. These tabs 112 are preferably aligned with the spaces between the tabs 30 of rake bars 28, so that comb member 110 and rake bars 28 cooperate to break up larger pieces of debris which might otherwise clog up the vacuum ducts within the system 10. A brush 114 with flexible bristles is attached to the other side of arm 42, and sweepingly engages the mesh screen 9 as the sweeping assembly pivots around the axis of the hub 41.

This system 10 allows full airflow exposure through the screen 9 to the engine cooling cores (not shown) and overcomes the limitations of previous rotary screen designs. As a result, engine cooling systems can perform better because they will have uniform airflow throughout the cores allowing better cooling. This invention also allows the use of cores with higher heat rejection characteristics to be used in the same size envelope due to the increased airflow available.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A screen cleaning system for cleaning a material catching screen surrounded by a frame, the cleaning system comprising:
   an arm assembly movable over a surface of the screen, the arm assembly including a hollow arm having an aperture in a first side which is adjacent to the surface of the screen, the arm assembly also including a guide roller rotatably mounted to the arm assembly;
   a hollow duct fixed with respect to the frame, the duct connecting the hollow arm to a source of vacuum pressure;
   an actuator mechanism for moving the arm assembly so that the aperture draws material off of the screen as the arm assembly moves over the screen;
   a track formed by the frame, the guide roller riding along the track as the arm assembly moves over the screen, the arm assembly having a rotatable inner arm, and an outer arm slidably coupled to the inner arm;
   a first bracket is fixed to the inner arm;
   a second bracket is fixed to the inner arm and is spaced apart from the first bracket;
   a guide rod is supported between the first and second brackets; and
   a sleeve is slidable on the guide rod, the outer arm being attached to the sleeve.

2. The screen cleaning system of claim 1, wherein:
the arm assembly carries a brush which brushingly engages the screen.

3. The screen cleaning system of claim 1, wherein the actuator mechanism comprises:
   a first pulley coupled to a drive shaft;
   a second pulley coupled to an end of the arm assembly; and
   a belt drivingly coupling the first pulley to the second pulley.

4. The screen cleaning system of claim 1, wherein:
a spring is mounted on the guide rod and is biased to urge the outer arm radially inwardly.

5. The screen cleaning system of claim 1, wherein:
a spring is biased to urge the outer arm radially inwardly.

\* \* \* \* \*